United States Patent
Rich

(10) Patent No.: US 11,319,159 B2
(45) Date of Patent: May 3, 2022

(54) CONVEYOR BELT ROLLER SUPPORT PROVIDING READY REMOVAL AND REPLACEMENT OR ROLLERS

(71) Applicant: Slick Rollers, LLC, Fort Mitchell, KY (US)

(72) Inventor: David Ray Rich, Union, KY (US)

(73) Assignee: Slick Rollers, LLC, Fort Mitchell, KY (US)

( * ) Notice: Subject to any disclaimer, the term of this patent is extended or adjusted under 35 U.S.C. 154(b) by 0 days.

(21) Appl. No.: 17/120,558

(22) Filed: Dec. 14, 2020

(65) Prior Publication Data

US 2021/0198048 A1     Jul. 1, 2021

Related U.S. Application Data

(60) Provisional application No. 62/955,720, filed on Dec. 31, 2019.

(51) Int. Cl.
     *B65G 39/12*       (2006.01)
     *B65G 15/60*       (2006.01)
     *B65G 39/04*       (2006.01)

(52) U.S. Cl.
     CPC .............. *B65G 39/12* (2013.01); *B65G 15/60* (2013.01)

(58) Field of Classification Search
None
See application file for complete search history.

(56) References Cited

U.S. PATENT DOCUMENTS

| | | | | |
|---|---|---|---|---|
| 3,053,368 | A * | 9/1962 | William ................. | B65G 39/12 |
| | | | | 193/35 R |
| 6,450,325 | B1 * | 9/2002 | Devnani ................ | B65G 23/08 |
| | | | | 198/784 |
| 7,762,387 | B2 * | 7/2010 | Dunn ..................... | B65G 39/16 |
| | | | | 198/823 |
| 9,033,135 | B1 * | 5/2015 | Sharp .................... | B65G 15/64 |
| | | | | 198/808 |

* cited by examiner

*Primary Examiner* — Kavel Singh
(74) *Attorney, Agent, or Firm* — Wood Herron & Evans LLP

(57) ABSTRACT

A conveyor comprises a belt, at least one roller supporting the belt on a lower side thereof, the roller having opposite ends and a spindle at each opposite end, and a roller support for the roller. The roller support comprises a pair of spaced apart support brackets positioned at opposite lateral sides of the belt, a torque tube having opposite ends pivotally supported by the brackets, and a pair of spaced apart arms fixedly secured to the torque tube, one of the arms located near one of the opposite ends of the roller and the other of the arms located near the other of the opposite ends of the roller, each arm having an upwardly opening notch therein for receiving a respective roller spindle. The torque tube is pivotable between a first position wherein the roller supports the belt and a second position wherein the roller is spaced below the belt and permits sufficient clearance for the roller spindles to be lifted out of the notches in the arms and the roller to be removed from the roller support.

7 Claims, 7 Drawing Sheets

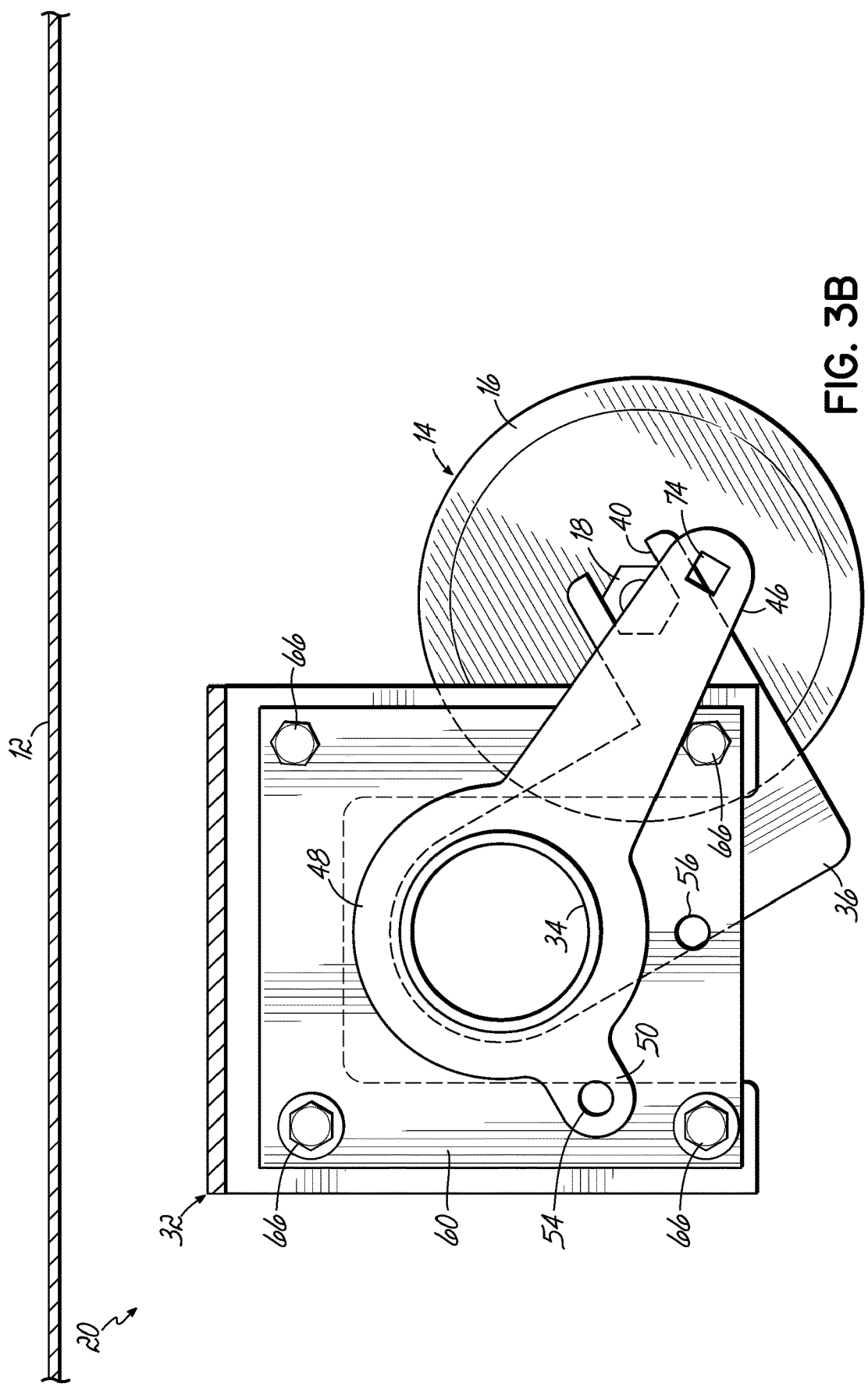

CONVEYOR BELT ROLLER SUPPORT PROVIDING READY REMOVAL AND REPLACEMENT OR ROLLERS

RELATED APPLICATIONS

This application claims the priority benefit of US Provisional Patent Application No. 62/955,720 filed Dec. 31, 2019, which is hereby incorporated by reference herein as if fully set forth in its entirety.

FIELD OF THE INVENTION

This invention relates generally to conveyors, and more particularly to roller supports for conveyor belt rollers that facilitate removal and replacement of the rollers.

BACKGROUND OF THE INVENTION

A conveyor comprises an endless belt that passes over a drive pulley at one end and over an idler pulley (or another drive pulley) at the other end. The lower or return side belt portion rides atop a plurality of rollers. These rollers spin on spindles, the ends of which rest in notches in brackets on either lateral side of the belt.

During operation the lower or return side rollers can become worn or damaged thus requiring their replacement. Currently replacement of worn or damaged rollers is a cumbersome process, requiring some type of mechanical assist to lift the conveyor belt up off of the worn or damaged roller high enough to permit the spindle ends of the worn or damaged roller to be lifted out of their respective notches in their respective brackets and the roller to be removed from the brackets, and to permit the spindle ends of a new roller to be dropped down into their respective notches in their respective brackets.

It is desirable to provide apparatus and method which makes it more convenient to remove worn conveyor belt rollers and replace them with new rollers.

SUMMARY OF THE INVENTION

In one aspect, a conveyor comprises a belt, at least one roller supporting the belt, the roller having opposite ends and a spindle at each opposite end, and a roller support for the roller. The roller support comprises a pair of spaced apart support brackets positioned at opposite lateral sides of the belt, a torque tube having opposite ends pivotally supported by the brackets, and a pair of spaced apart arms fixedly secured to the torque tube, one of the arms located near one of the opposite ends of the roller and the other of the arms located near the other of the opposite ends of the roller, each arm having an upwardly opening notch therein for receiving a respective roller spindle. The torque tube is pivotable between a first position wherein the roller supports the belt and a second position wherein the roller is spaced below the belt and permits sufficient clearance for the roller spindles to be lifted out of the notches in the arms and the roller to be removed from the roller support.

The conveyor can further comprise a lever fixedly secured to one of the opposite ends of the torque tube, a hole in the lever, a hole in the support bracket associated with the one of the opposite ends of the torque tube, a pin, and a stop on the support bracket. When the holes are aligned the pin is inserted through the holes to maintain the torque tube in the first position, and when the pin is removed from the holes the torque tube is free to pivot to the second position whereupon the lever contacts the stop.

The first and second positions can be about 60 degrees apart.

The lever can include a collar fixedly secured thereto, the collar fixedly secured to the torque tube, the collar including a tang extending radially outwardly from a periphery thereof, and wherein the lever hole is in the tang.

The conveyor can further include a plate removably secured to the support bracket, the lever positioned laterally outboard of the plate, and a collar fixedly secured to the torque tube and positioned laterally inboard of the plate, the torque tube pivotally supported by the plate. The lever, collar, and plate prevent the torque tube from axially backing out of the support brackets. Removing the plate from the support bracket allows the torque tube to be axially withdrawn from the support brackets.

The stop can be a bolt removably securing the plate to the support bracket and the support bracket hole can be in the plate.

The lever can include an aperture in a distal end thereof that is engageable with an engagement end of a ratchet wrench. The ratchet wrench can then be lifted slightly to slightly raise the roller against the bias of the belt, deloading the pin, and thus permitting easy removal of the pin from the holes.

The accompanying drawings, which are incorporated in and constitute a part of this specification, illustrate embodiments of the invention and, together with the summary of the invention given above, and the detailed description of the drawings given below, serve to explain the principles of the present invention.

BRIEF DESCRIPTION OF THE DRAWINGS

FIG. 3B is a view similar to FIG. 3A with the roller in the belt disengaged position.

DETAILED DESCRIPTION OF THE DRAWINGS

Figure 1:
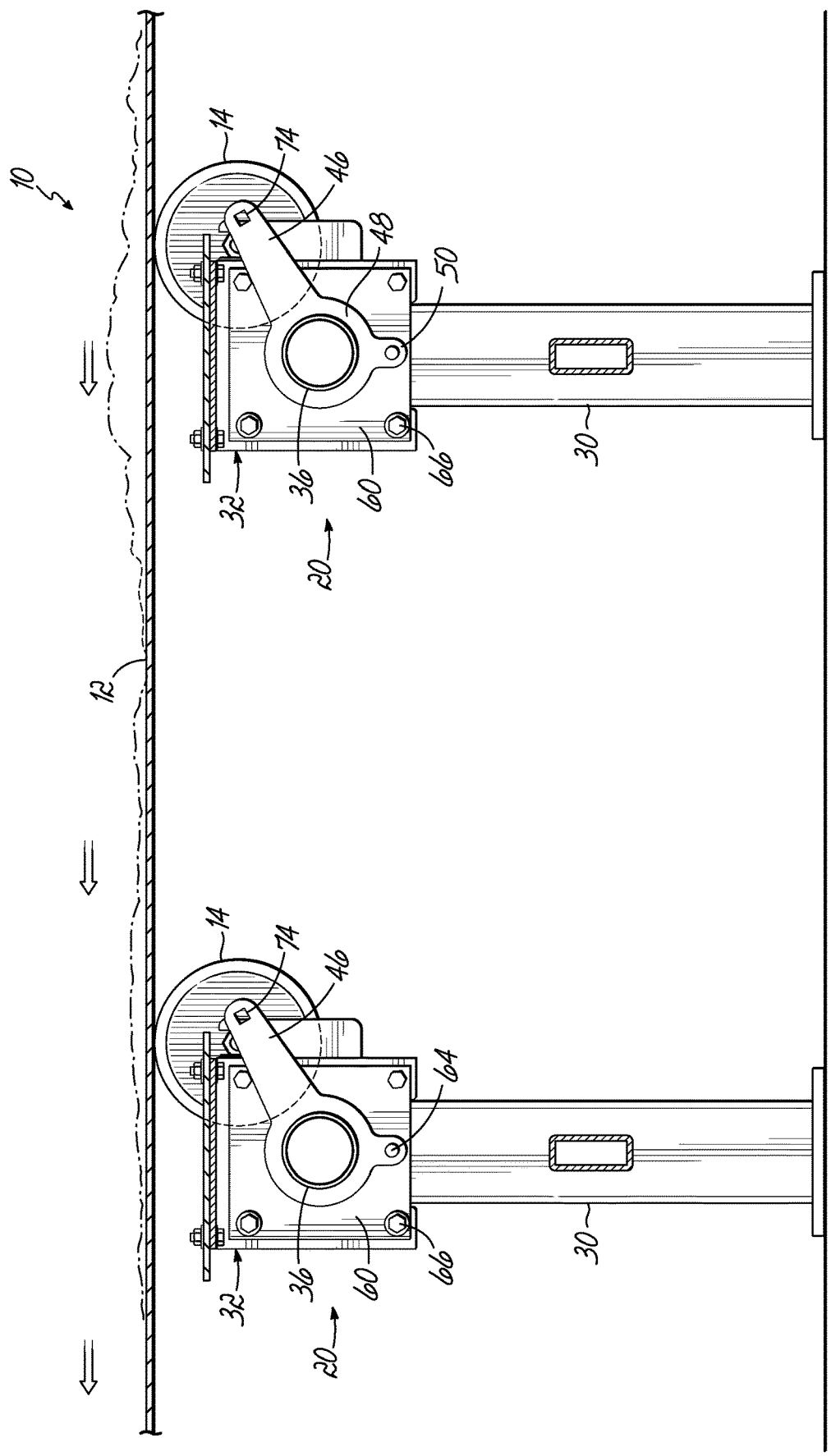
FIG. 1 is a side view of a conveyor according to the principles of the present invention.
Figure 2A:
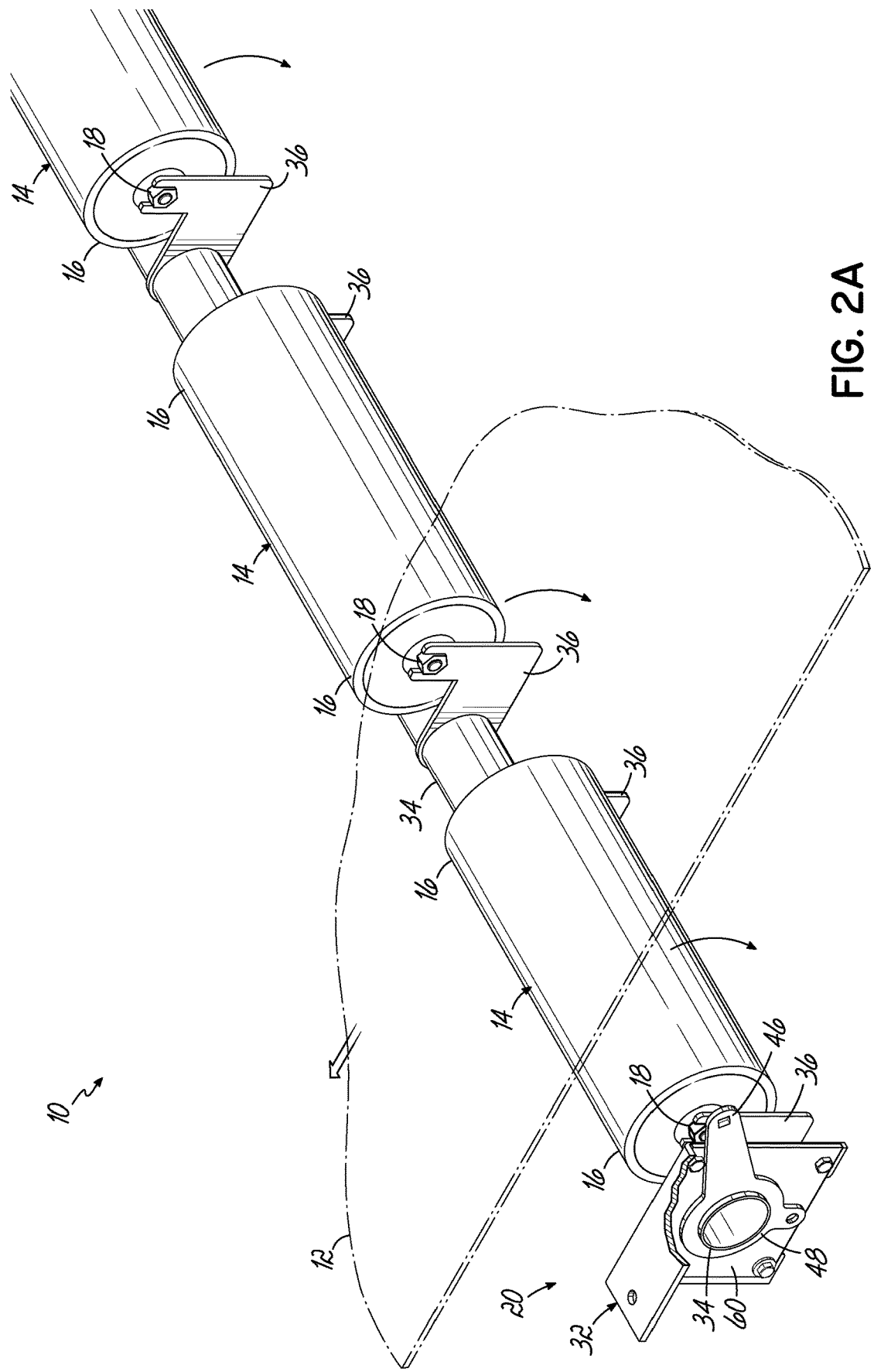
FIG. 2A is a partial perspective view of a portion of the roller support of FIG. 1.
Figure 2B:
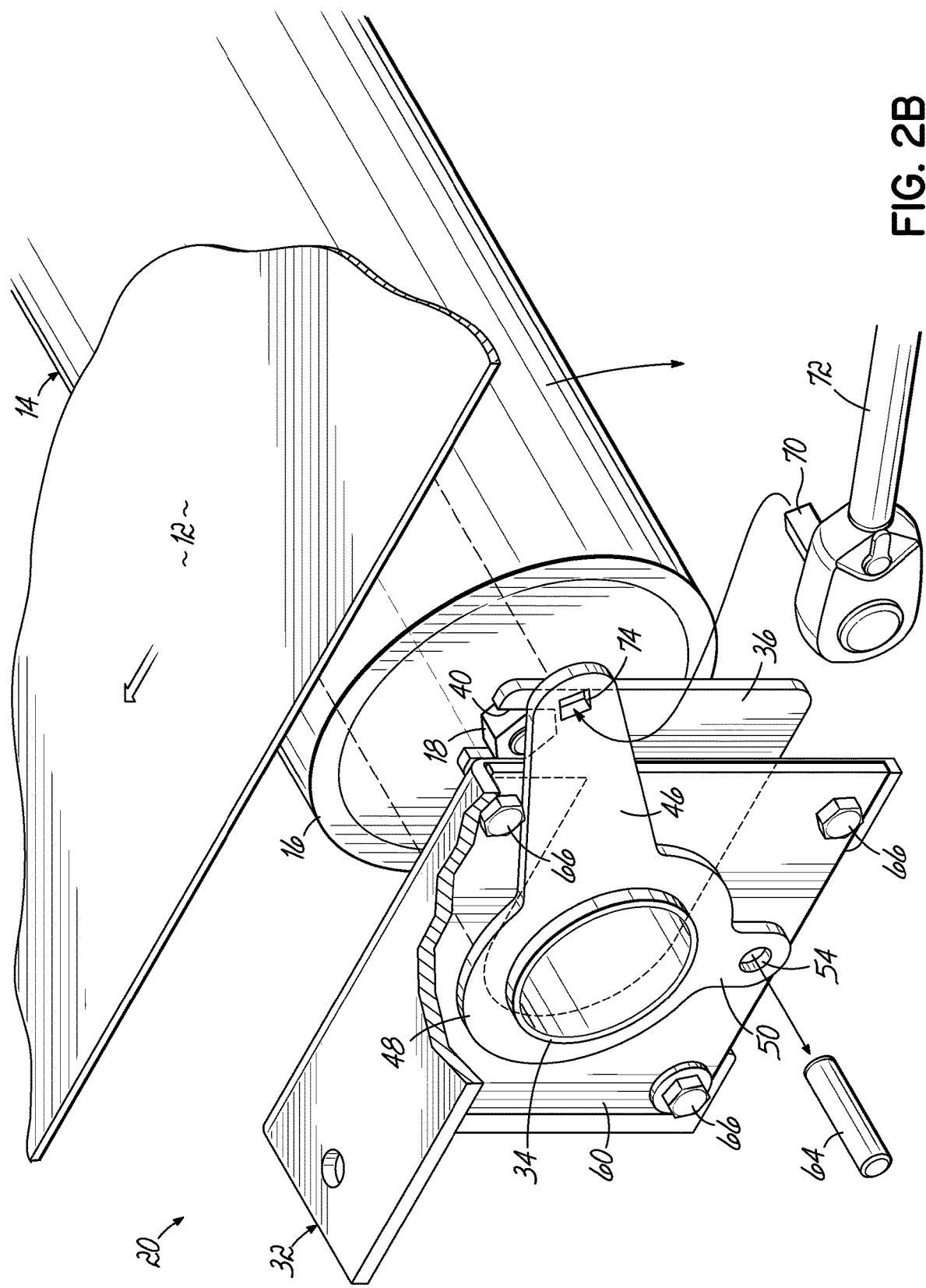
FIG. 2B is an enlarged partial perspective view of a portion of the roller support of FIG. 2A.

Referring to first to FIGS. 1 and 2A, a conveyor 10 comprises a belt 12 and a number of rollers 14 supporting the belt 12. Each roller 14 has opposite ends 16 and a spindle 18 at each opposite end 16. Each roller 14 is supported by a roller support 20. As illustrated, three rollers 14 are positioned end-to-end due to the width of the belt 12. However, it will be appreciated that fewer than three rollers 14 or more than three rollers 14 could be utilized based on the width of the belt 12. An upright support 30 is diagrammatically shown as supporting each roller support 20, though the roller supports 20 could be supported by the stringer(s) (not shown) of the conveyor 10.

Referring to FIGS. 2B through 3C, each roller support 20 comprises a pair of spaced apart support brackets 32 (only one of which is shown) positioned at opposite lateral sides of the belt 12, a torque tube 34 having opposite ends pivotally supported by the brackets 32, and a pair of spaced apart arms 36 fixedly secured to the torque tube 34 as by welding. One of the arms 36 is located near one of the opposite ends 16 of the roller 14 and the other of the arms 36 is located near the other of the opposite ends 16 of the roller 14. Each arm has an upwardly opening notch 40 therein for receiving a respective roller spindle 18.

Figure 3A:
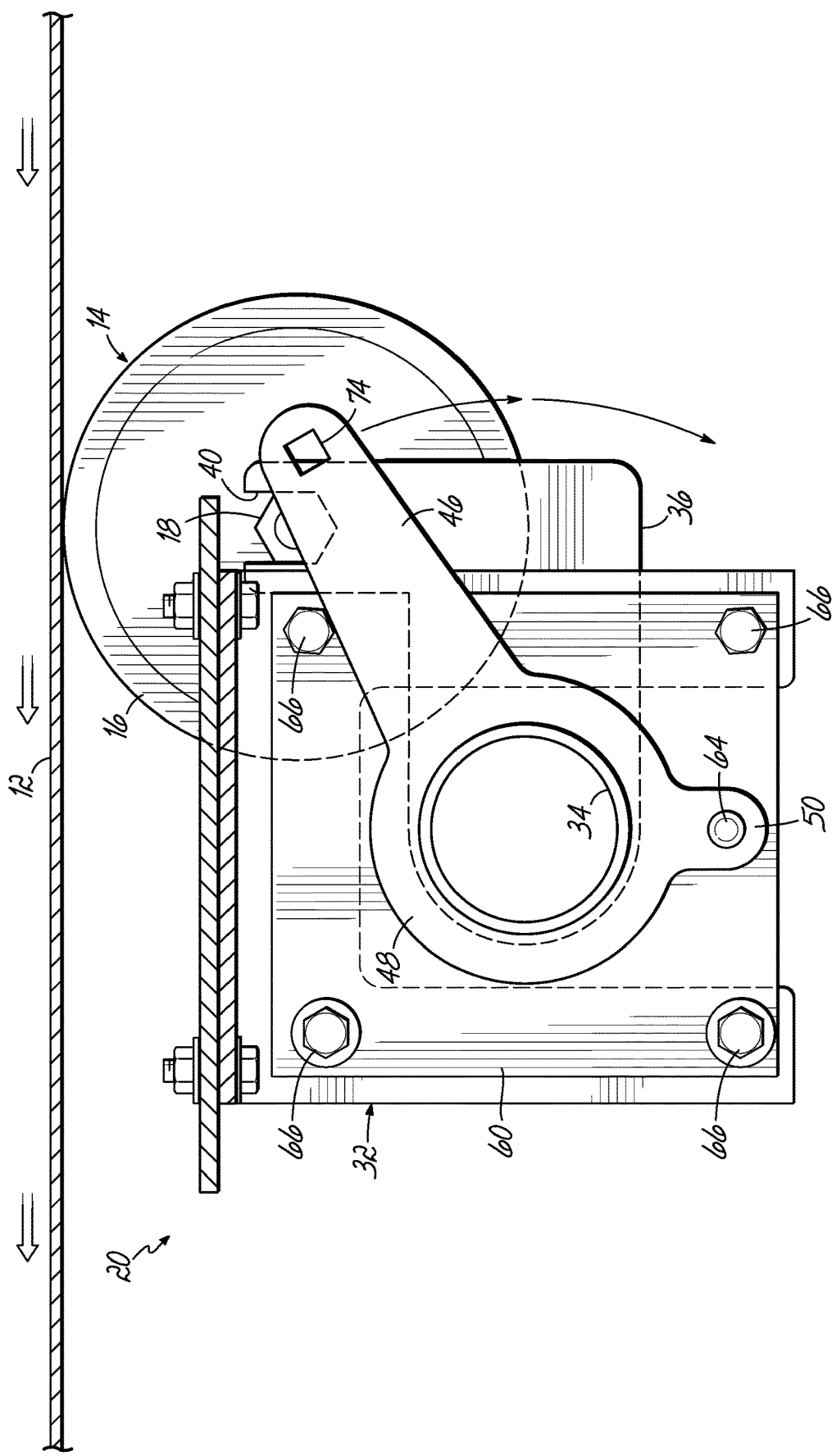
FIG. 3A is a side view of the roller support of FIGS. 2A and 2B with the roller in the belt engaged position.
Figure 3C:
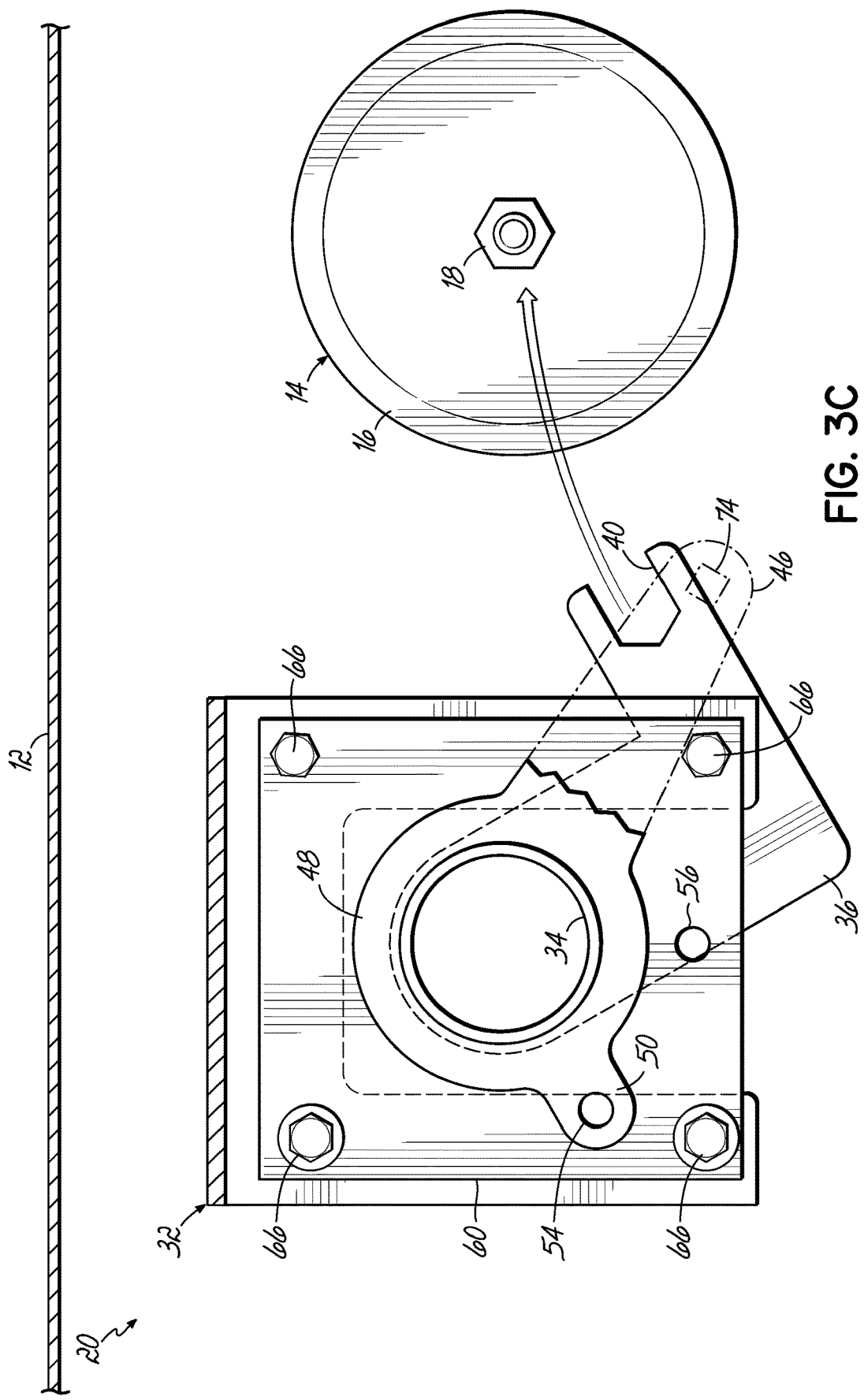
FIG. 3C is a view similar to FIG. 3B with the roller being removed from the roller support.

The torque tube 34 is pivotable between a first position wherein the roller 14 supports the belt 12 (FIG. 3A), and a second position wherein the roller 14 is spaced below the belt 12 and permits sufficient clearance for the roller spindles 18 to be lifted out of the notches 40 in the arms 36 so that the roller 14 can be removed from the roller support 20 (FIGS. 3B and 3C).

A lever 46 is fixedly secured to one of the opposite ends of the torque tube 34. The lever 46 has a collar or ring 48 fixedly secured thereto or made as a part thereof, the collar 48 being fixedly secured to the torque tube 34 as by welding. The collar 48 includes a tang 50 extending radially outwardly from a periphery thereof. The tang 50 has a hole 54 therein which aligns with a similar hole 56 in a plate 60. A pin 64 is inserted through holes 54, 56 when the roller 14 is in the belt 12 supporting position. The torque tube 34 is pivotally supported in a hole in the plate 60.

Figure 4:
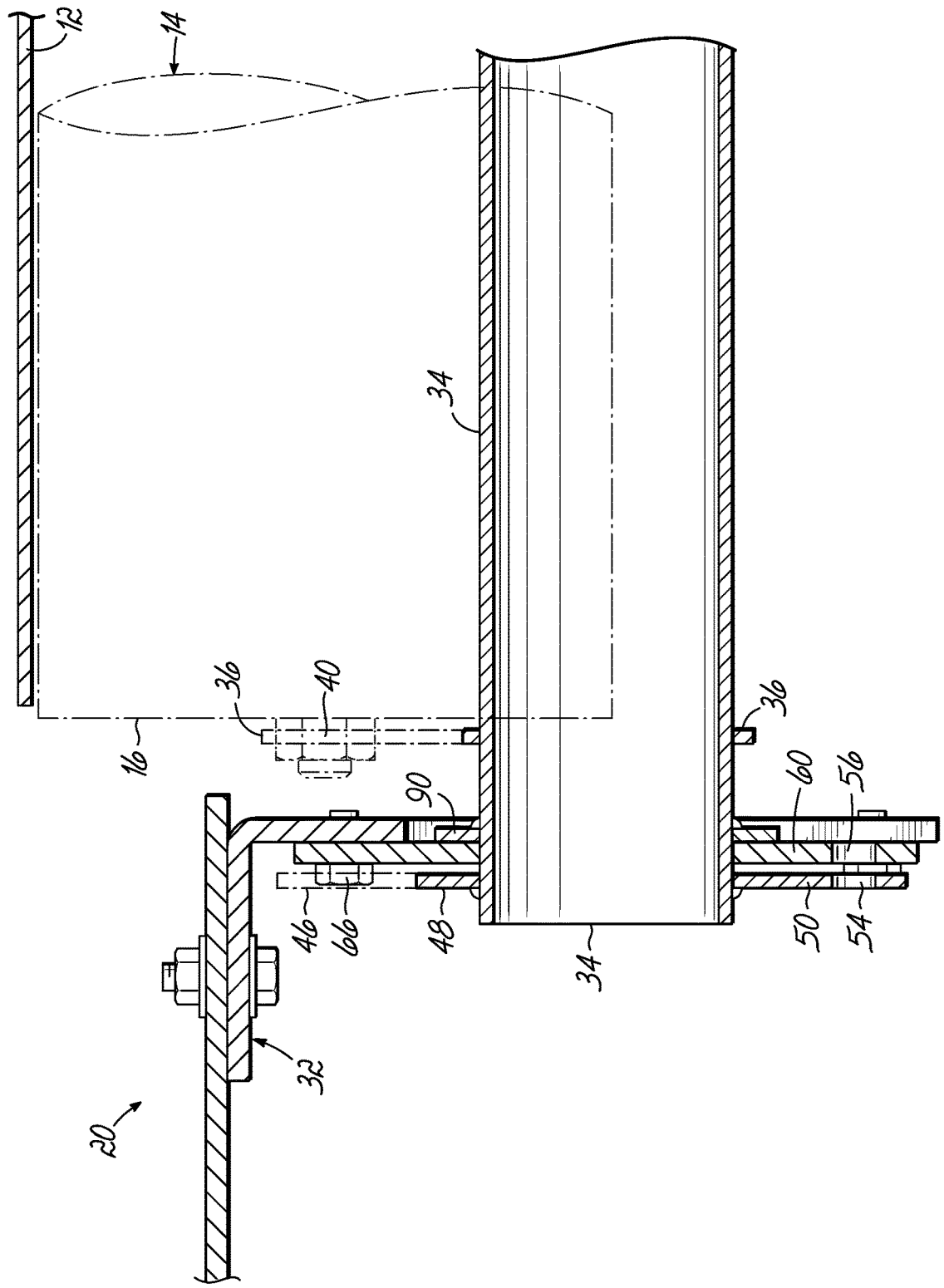
FIG. 4 is a cross-sectional view of FIG. 2B.

Plate 60 is positioned laterally outboard of support bracket 32 and is bolted thereto with bolts 66. Lever 46 is positioned laterally outboard of plate 60. A second collar or ring 90 is fixedly secured to the torque tube 34 as by welding and is positioned laterally inboard of the plate 60. See FIG. 4. Once the plate 60 is bolted to the support bracket 32, the lever 46 and its collar 48, along with the second collar 90, prevent the torque tube 34 from axially backing out of the roller supports 20 during operation of the conveyor 10. The opposite end of the torque tube 34 is simply pivotally supported in a hole in the opposite support bracket 32 on the opposite lateral side of the belt 12. Unbolting the plate 60 from the support bracket 32 permits the plate 60 to be removed and the captivated or captured torque tube 34 to be axially withdrawn from the roller supports 20.

The first and second positions are preferably about 60 degrees apart. One of the bolts 66 can function as a stop for the lever 46 in the second position. See FIG. 3B.

To deload the pin 64 when it is desired to remove a roller 14 from its roller support 20, the engagement end 70 of a ratchet wrench 72 can be placed in a complementary hole 74 in the lever 64. The ratchet wrench 72 can then be lifted slightly to slightly raise the roller 14 against the bias of the belt 12, deloading the pin 64, permitting easy removal of pin 64 from the holes 54, 56.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. The invention resides in each individual feature described herein, alone, and in all combinations of any and all of those features. Departures may therefore be made from such details without departing from the spirit or scope of the general inventive concept. Accordingly, the scope of the invention shall be limited only by the following claims and their equivalents.

What is claimed is:

1. A conveyor comprising:
   a conveyor belt,
   at least one roller supporting said belt, said roller having opposite ends and a spindle at each said opposite end, and
   a roller support for said roller, said roller support comprising:
      a pair of spaced apart support brackets positioned at opposite lateral sides of said belt,
      a torque tube having opposite ends pivotally supported by said brackets and having a longitudinal axis generally transverse to a longitudinal extent of said conveyor belt, and
      a pair of spaced apart arms fixedly secured to said torque tube, one of said arms located near one of said opposite ends of said roller and the other of said arms located near the other of said opposite ends of said roller, each said arm having an upwardly opening notch therein for receiving a respective roller spindle,
      said torque tube pivotable about the torque tube pivot axis between a first position wherein said roller supports said belt and a second position wherein said roller is spaced below said belt and permits sufficient clearance for said roller spindles to be lifted out of said notches in said arms and said roller to be removed from said roller support.

2. The conveyor of claim 1 further comprising:
   a lever fixedly secured to one of said opposite ends of said torque tube,
   a hole in said lever,
   a hole in said support bracket associated with said one of said opposite ends of said torque tube,
   a pin, and
   a stop on said support bracket,
   wherein when said holes are aligned said pin is inserted through said holes to maintain said torque tube in the first position, and wherein when said pin is removed from said holes said torque tube is free to pivot to the second position whereupon said lever contacts said stop.

3. The conveyor of claim 2 wherein the first and second positions are about 60 degrees apart.

4. A conveyor comprising:
   a conveyor belt,
   at least one roller supporting said belt, said roller having opposite ends and a spindle at each said opposite end, and
   a roller support for said roller, said roller support comprising:
      a pair of spaced apart support brackets positioned at opposite lateral sides of said belt,
      a torque tube having opposite ends pivotally supported by said brackets, and
      a pair of spaced apart arms fixedly secured to said torque tube, one of said arms located near one of said opposite ends of said roller and the other of said arms located near the other of said opposite ends of said roller, each said arm having an upwardly opening notch therein for receiving a respective roller spindle,
      said torque tube pivotable between a first position wherein said roller supports said belt and a second position wherein said roller is spaced below said belt and permits sufficient clearance for said roller spindles to be lifted out of said notches in said arms and said roller to be removed from said roller support, a lever fixedly secured to one of said opposite ends of said torque tube, a hole in said lever, a hole in said support bracket associated with said one of said opposite ends of said torque tube, a pin, and a stop on said support bracket, wherein when said holes are aligned said pin is inserted through said holes to maintain said torque tube in the first position, and wherein when said pin is removed from said holes said torque tube is free to pivot to the second position whereupon said lever contacts said stop, wherein said lever includes a collar fixedly secured thereto, said collar fixedly secured to said torque tube, said collar including a tang extending radially outwardly from a periphery thereof, and wherein said lever hole is in said tang.

5. A conveyor comprising:

a conveyor belt, at least one roller supporting said belt, said roller having opposite ends and a spindle at each said opposite end, and a roller support for said roller, said roller support comprising:

a pair of spaced apart support brackets positioned at opposite lateral sides of said belt, a torque tube having opposite ends pivotally supported by said brackets, and a pair of spaced apart arms fixedly secured to said torque tube, one of said arms located near one of said opposite ends of said roller and the other of said arms located near the other of said opposite ends of said roller, each said arm having an upwardly opening notch therein for receiving a respective roller spindle, said torque tube pivotable between a first position wherein said roller supports said belt and a second position wherein said roller is spaced below said belt and permits sufficient clearance for said roller spindles to be lifted out of said notches in said arms and said roller to be removed from said roller support, a lever fixedly secured to one of said opposite ends of said torque tube, a hole in said lever, a hole in said support bracket associated with said one of said opposite ends of said torque tube, a pin, and a stop on said support bracket, wherein when said holes are aligned said pin is inserted through said holes to maintain said torque tube in the first position, and wherein when said pin is removed from said holes said torque tube is free to pivot to the second position whereupon said lever contacts said stop, further including a plate removably secured to said support bracket, said lever positioned laterally outboard of said plate, and a collar fixedly secured to said torque tube and positioned laterally inboard of said plate, said torque tube pivotally supported by said plate, whereby said lever, collar, and plate prevent said torque tube from axially backing out of said support brackets, and whereby removing said plate from said support bracket allows said torque tube to be axially withdrawn from said support brackets.

6. The conveyor of claim 5 wherein said stop is a bolt removably securing said plate to said support bracket and wherein said support bracket hole is in said plate.

7. A conveyor comprising:

a conveyor belt, at least one roller supporting said belt, said roller having opposite ends and a spindle at each said opposite end, and a roller support for said roller, said roller support comprising:

a pair of spaced apart support brackets positioned at opposite lateral sides of said belt, a torque tube having opposite ends pivotally supported by said brackets, and a pair of spaced apart arms fixedly secured to said torque tube, one of said arms located near one of said opposite ends of said roller and the other of said arms located near the other of said opposite ends of said roller, each said arm having an upwardly opening notch therein for receiving a respective roller spindle, said torque tube pivotable between a first position wherein said roller supports said belt and a second position wherein said roller is spaced below said belt and permits sufficient clearance for said roller spindles to be lifted out of said notches in said arms and said roller to be removed from said roller support, a lever fixedly secured to one of said opposite ends of said torque tube, a hole in said lever, a hole in said support bracket associated with said one of said opposite ends of said torque tube, a pin, and a stop on said support bracket, wherein when said holes are aligned said pin is inserted through said holes to maintain said torque tube in the first position, and wherein when said pin is removed from said holes said torque tube is free to pivot to the second position whereupon said lever contacts said stop, wherein said lever includes an aperture in a distal end thereof that is engageable with an engagement end of a ratchet wrench, whereby the ratchet wrench can then be lifted slightly to slightly raise said roller against the bias of said belt, deloading said pin, and thus permitting easy removal of said pin from said holes.

* * * * *

UNITED STATES PATENT AND TRADEMARK OFFICE
CERTIFICATE OF CORRECTION

| | | |
|---|---|---|
| PATENT NO. | : 11,319,159 B2 | Page 1 of 1 |
| APPLICATION NO. | : 17/120558 | |
| DATED | : May 3, 2022 | |
| INVENTOR(S) | : David Ray Rich | |

It is certified that error appears in the above-identified patent and that said Letters Patent is hereby corrected as shown below:

On the Title Page

Item (54), delete:
"CONVEYOR BELT ROLLER SUPPORT PROVIDING READY REMOVAL AND REPLACEMENT OR ROLLERS",
Insert:
--CONVEYOR BELT ROLLER SUPPORT PROVIDING READY REMOVAL AND REPLACEMENT OF ROLLERS--.

In the Specification

Column 1, Lines 1-3 delete:
"CONVEYOR BELT ROLLER SUPPORT PROVIDING READY REMOVAL AND REPLACEMENT OR ROLLERS",
Insert:
--CONVEYOR BELT ROLLER SUPPORT PROVIDING READY REMOVAL AND REPLACEMENT OF ROLLERS--.

Signed and Sealed this
Twenty-fifth Day of April, 2023

Katherine Kelly Vidal
*Director of the United States Patent and Trademark Office*